United States Patent
Takagaki

(10) Patent No.: US 10,836,310 B2
(45) Date of Patent: Nov. 17, 2020

(54) LIGHT SOURCE CONTROL DEVICE FOR VEHICLE AND COMPUTER-READABLE MEDIUM STORING A LIGHT SOURCE CONTROL PROGRAM FOR VEHICLE

(71) Applicant: TOYOTA JIDOSHA KABUSHIKI KAISHA, Toyota-shi (JP)

(72) Inventor: Tatsuya Takagaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/356,323

(22) Filed: Mar. 18, 2019

(65) Prior Publication Data

US 2019/0291641 A1 Sep. 26, 2019

(30) Foreign Application Priority Data

Mar. 22, 2018 (JP) ................. 2018-055333

(51) Int. Cl.
| | | |
|---|---|---|
| *B60Q 11/00* | (2006.01) | |
| *B60Q 1/00* | (2006.01) | |
| *B60Q 1/04* | (2006.01) | |
| *H05B 45/40* | (2020.01) | |
| *H05B 45/50* | (2020.01) | |
| *H05B 45/58* | (2020.01) | |

(52) U.S. Cl.
CPC .......... *B60Q 11/005* (2013.01); *B60Q 1/0076* (2013.01); *B60Q 1/04* (2013.01); *H05B 45/40* (2020.01); *H05B 45/50* (2020.01); *H05B 45/58* (2020.01); *B60Q 2300/05* (2013.01)

(58) Field of Classification Search
CPC ...... B60Q 11/005; B60Q 1/04; B60Q 1/0076; B60Q 2300/05; H05B 33/0821; H05B 33/0884; H05B 33/089; H05B 33/0893; H05B 45/58; H05B 45/50; H05B 45/40
See application file for complete search history.

(56) References Cited

U.S. PATENT DOCUMENTS

| | | | |
|---|---|---|---|
| 8,125,101 B1* | 2/2012 | Jaworski | B60Q 1/1407 307/10.8 |
| 9,517,715 B1 | 12/2016 | Sitarski | |
| 2010/0308739 A1* | 12/2010 | Shteynberg | H05B 33/083 315/193 |
| 2013/0002155 A1 | 1/2013 | Hu et al. | |
| 2016/0360586 A1* | 12/2016 | Yang | H05B 33/0815 |
| 2017/0027028 A1* | 1/2017 | Segers | H05B 33/0809 |
| 2018/0050631 A1* | 2/2018 | Wonhong | B60Q 1/1423 |
| 2019/0098710 A1* | 3/2019 | Murakami | H05B 45/00 |

FOREIGN PATENT DOCUMENTS

| | | |
|---|---|---|
| EP | 2 675 247 A1 | 12/2013 |
| JP | 2010-241347 | 10/2010 |
| KR | 10-2013-0001135 A | 1/2013 |

* cited by examiner

*Primary Examiner* — Renan Luque
(74) *Attorney, Agent, or Firm* — Oblon, McClelland, Maier & Neustadt, L.L.P.

(57) ABSTRACT

A light source control device for a vehicle is provided with a low beam and a high beam that are connected in series, an LED driving circuit that supplies electricity to the low beam and the high beam, and a first switch of which one end is connected to between the low beam and the high beam and the other end is connected to ground.

18 Claims, 13 Drawing Sheets

FIG.5

| MODE | ILLUMINATION STATE ||||| SWITCHING STATE |||||
|---|---|---|---|---|---|---|---|---|---|---|
| | POSITION | LOW BEAM | HIGH BEAM | DAYLIGHT | | SW1 | SW2 | SW3 | SW4 | SW5 |
| 1 | ON | OFF | OFF | OFF | | ON | ON | OFF | OFF | OFF |
| 2 | OFF | ON | OFF | OFF | | OFF | OFF | ON | ON | OFF |
| 3 | ON | ON | OFF | OFF | | ON | OFF | OFF | ON | OFF |
| 4 | OFF | ON | ON | OFF | | OFF | OFF | ON | OFF | OFF |
| 5 | ON | ON | ON | OFF | | ON | OFF | OFF | OFF | OFF |
| 6 | OFF | OFF | OFF | ON | | OFF | OFF | OFF | OFF | ON |

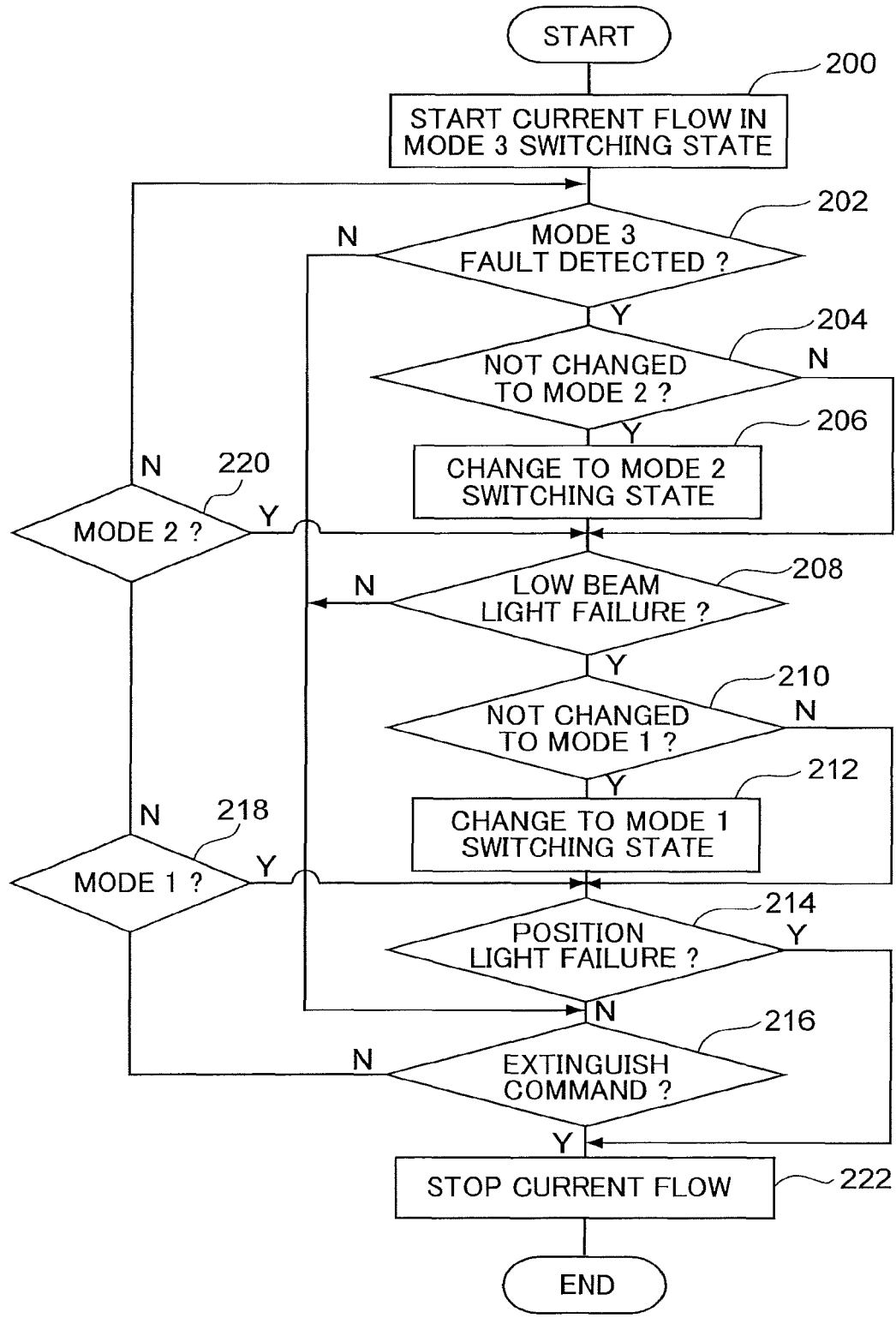

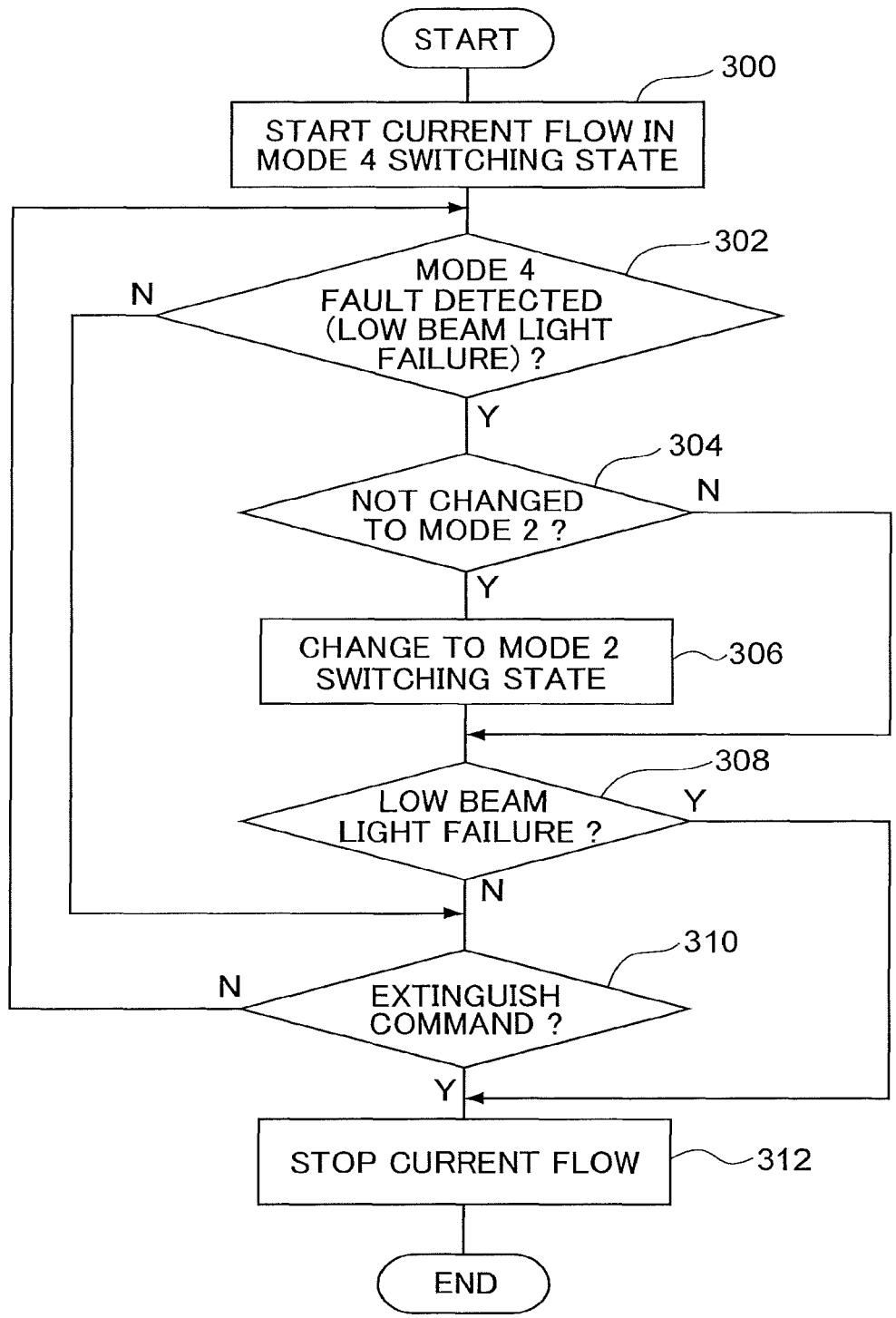

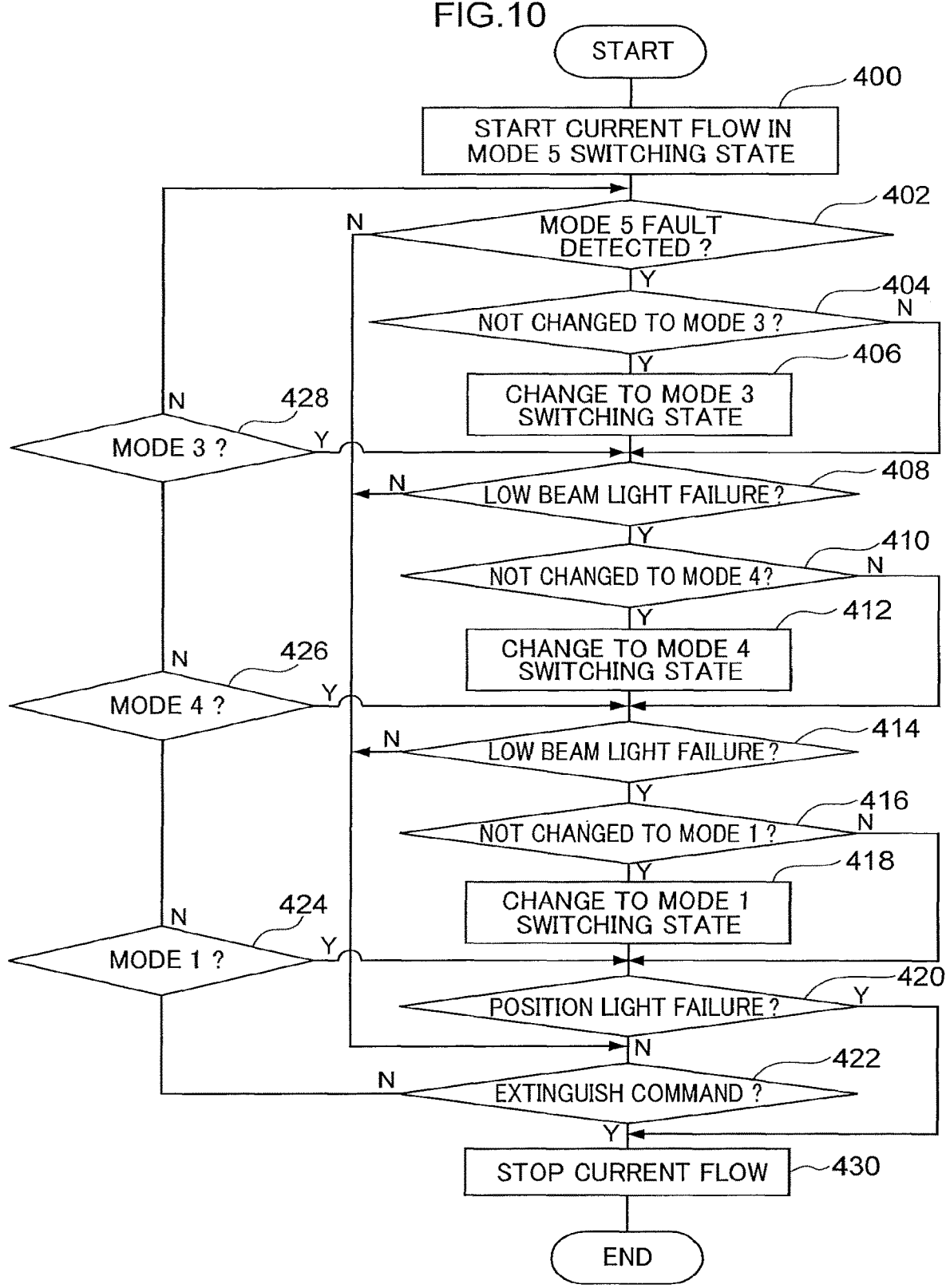

LIGHT SOURCE CONTROL DEVICE FOR VEHICLE AND COMPUTER-READABLE MEDIUM STORING A LIGHT SOURCE CONTROL PROGRAM FOR VEHICLE

CROSS-REFERENCE TO RELATED APPLICATION

This application is based on and claims priority under 35 USC 119 from Japanese Patent Application No. 2018-055333 filed on Mar. 22, 2018, the disclosure of which is incorporated by reference herein.

TECHNICAL FIELD

The present disclosure relates to a light source control device, and a computer-readable storage medium storing a light source control program that control light emission from plural light sources mounted at a vehicle.

RELATED ART

There are vehicles in which plural light sources are installed in the vehicle and the plural light sources are driven by a single driving circuit.

For example, Japanese Patent Application Laid-Open (JP-A) No. 2010-241347 (Patent Reference 1) proposes a vehicle light that includes a light source unit and a driving unit. The light source unit includes nighttime-use LEDs and daytime-use LEDs. The driving unit includes a single DC/DC converter and a control section. The DC/DC converter supplies a constant driving current to the nighttime-use LEDs and the daytime-use LEDs. When the control section receives nighttime-use light source illumination command signals, the control section illuminates the nighttime-use LEDs, and when the control section receives daytime-use light source illumination command signals, the control section illuminates the daytime-use LEDs.

However, in the technology of Patent Reference 1, the nighttime-use LEDs and the daytime-use LEDs are connected with the DC/DC converter in parallel. Depending on the location of a ground connection, a malfunction at one light source may cause a malfunction in control of the other light source. Therefore, there is scope for improvement.

SUMMARY

The present disclosure is made in consideration of the circumstances described above. An object of the present disclosure is to provide a light source control device for a vehicle and a computer-readable storage medium storing a light source control program for a vehicle that may, when plural light sources are driven by a single driving circuit and a malfunction occurs at one of the light sources, effectively utilize a light source at which no malfunction has occurred.

In order to achieve the object described above, a light source control device for a vehicle according to a first aspect includes: plural light sources connected in series; a supply section that supplies electricity to the plural light sources; and a change section that changes a supply path along which electricity is supplied from the supply section to the plural light sources.

According to the first aspect, the plural light sources are connected in series and electricity is supplied by the supply section.

The supply path that supplies electricity from the supply section to the plural light sources is changed by the change section. Thus, when a malfunction is caused by a disconnection or the like, the supply path for electricity may be changed by the change section and light sources at which no malfunction has occurred may be utilized effectively. For example, if a malfunction such as a disconnection or the like occurs in a state in which a plural number of the plural light sources that are connected in series are illuminated concurrently, all of the light sources will be extinguished. However, as a result of the change section changing the supply path for electricity, electricity may be supplied to a light source at which no malfunction has occurred.

As in a second aspect: the plural light sources may include a first light source that is illuminated by electricity supplied from the supply section, and a second light source that is connected in series with the first light source and is illuminated by electricity supplied from the supply section; and the change section may include a first switch of which one end is connected to between the first light source and the second light source and another end is connected to ground. Accordingly, if a malfunction occurs in a state in which the first light source and the second light source are illuminated concurrently, the supply path for electricity may be changed and the first light source recovered by the first switch being turned on, provided no malfunction has occurred at the first light source.

As in a third aspect: the plural light sources may further include a third light source that is connected in series with the first light source and is illuminated by electricity supplied from the supply section; and the change section may further include a second switch provided between the supply section and an electricity supply path upstream side of the third light source, a third switch provided between the supply section and an electricity supply path upstream side of the first light source, and a fourth switch of which one end is connected to between the first light source and the third light source and another end is connected to ground. Accordingly, if a malfunction occurs in a state in which a plural number of the three light sources are illuminated concurrently, the supply path for electricity may be changed and a light source at which no malfunction has occurred recovered by the first to fourth switches being turned on and off.

As in a fourth aspect, the light source control device for a vehicle may further include: a fault detection section that detects a fault in the supply path; and a control section that, in response to a pre-specified illumination command, performs control to turn each of the first switch, second switch, third switch and fourth switch on or off and controls the electricity supply path from the supply section, and that, when a fault is detected by the fault detection section in a state in which a plural number of the plural light sources are illuminated concurrently, performs control to turn each of the first switch, second switch, third switch and fourth switch on or off and implements recovery control of the light sources. Accordingly, when a fault is detected by the fault detection section, a light source at which no malfunction has occurred may be recovered by recovery control by the control section.

As in a fifth aspect, when a fault is detected by the fault detection section in a state in which the first switch and the second switch are both on and the other switches are off and the first light source and third light source are illuminated concurrently, the control section may perform control to turn off the second switch and turn on the third switch and may implement recovery control of the first light source. Accordingly, when a malfunction occurs, the first light source may be recovered provided no malfunction has occurred at the first light source.

As in a sixth aspect, when a fault is detected by the fault detection section after the recovery control of the first light source, the control section may perform control to turn on the second switch and fourth switch and turn off the first switch and third switch and may implement recovery control of the third light source. Accordingly, when a malfunction occurs, the third light source may be recovered provided no malfunction has occurred at the third light source.

As in a seventh aspect, when a fault is detected by the fault detection section in a state in which the third switch is on and the other switches are off and the first light source and second light source are illuminated concurrently, the control section may perform control to turn on the first switch and may implement recovery control of the first light source. Accordingly, the first light source may be recovered provided no malfunction has occurred at the first light source.

As in an eighth aspect, when a fault is detected by the fault detection section in a state in which the second switch is on and the other switches are off and the first light source, second light source and third light source are illuminated concurrently, the control section may perform control to turn on the first switch and may implement recovery control of the first light source and third light source. Accordingly, the first light source and the third light source may be recovered provided no malfunction has occurred at the first light source or the third light source.

As in a ninth aspect, when a fault is detected by the fault detection section after the recovery control of the first light source and third light source, the control section may perform control to turn off the first switch and second switch and turn on the third switch and may implement recovery control of the first light source and second light source. Accordingly, the first light source and the second light source may be recovered provided no malfunction has occurred at the first light source or the second light source.

As in a tenth aspect, when a fault is detected by the fault detection section after the recovery control of the first light source and second light source, the control section may perform control to turn off the third switch and turn on the second switch and fourth switch and may implement recovery control of the third light source. Accordingly, the third light source may be recovered provided no malfunction has occurred at the third light source.

As in an eleventh aspect, when a fault is detected by the fault detection section in a state in which the second switch is on and the other switches are off and the first light source, second light source and third light source are illuminated concurrently, the control section may perform control to turn on the third switch and turn off the second switch and may implement recovery control of the first light source and second light source. Accordingly, the first light source and the second light source may be recovered provided no malfunction has occurred at the first light source or the second light source.

As in a twelfth aspect, when a fault is detected by the fault detection section after the recovery control of the first light source and second light source, the control section may perform control to turn on the first switch and second switch and turn off the third switch and may implement recovery control of the first light source and third light source. Accordingly, the first light source and the third light source may be recovered provided no malfunction has occurred at the first light source or the third light source.

As in a thirteenth aspect, when a fault is detected by the fault detection section after the recovery control of the first light source and third light source, the control section may perform control to turn off the first switch and turn on the fourth switch and may implement recovery control of the third light source. Accordingly, the third light source may be recovered provided no malfunction has occurred at the third light source.

As in a fourteenth aspect, the light source control device for a vehicle may further include: a fault detection section that detects a fault in the supply path; and a control section that, in response to a pre-specified illumination command, controls the change section and controls the electricity supply path from the supply section, and that, when a fault is detected by the fault detection section in a state in which a plural number of the plural light sources are illuminated concurrently, controls the change section so as to change the supply path. Accordingly, when a fault is detected by the fault detection section, a light source at which no malfunction has occurred may be recovered by control by the control section.

As in a fifteenth aspect, the light source control device for a vehicle may further include: a fault detection section that detects a fault in the supply path; and a control section that, in response to an illumination command, turns the first switch on or off and controls the electricity supply path from the supply section, and that, when a fault is detected by the fault detection section in a state in which the first switch has been controlled to turn off and the first light source and second light source are illuminated concurrently, performs control to turn on the first switch. Accordingly, when a fault is detected by the fault detection section, a light source at which no malfunction has occurred may be recovered by control by the control section.

As in a sixteenth aspect, the first light source may be a low beam and the second light source may be a high beam.

The present disclosure may be configured as a light source control program for a vehicle that causes a computer to function as the control section of the light source control device for a vehicle according to any one of the fourth to sixteenth aspects.

According to the present disclosure as described above, an effect is provided in that a light source control device for a vehicle and a light source control program for a vehicle may be provided that, when plural light sources are driven by a single driving circuit and a malfunction occurs at one of the light sources, effectively utilize a light source at which no malfunction has occurred.

BRIEF DESCRIPTION OF DRAWINGS

FIG. 5 is a table showing illumination states and switching states of light sources in respective modes of the light source control device for a vehicle according to the second exemplary embodiment.

FIG. 6 is a flowchart showing an example of a flow of processing at a time of illumination in mode 3 that is executed by a control section of the light source control device for a vehicle according to the second exemplary embodiment.

FIG. 8 is a flowchart showing an example of a flow of processing at a time of illumination in mode 4 that is executed by the control section of the light source control device for a vehicle according to the second exemplary embodiment.

FIG. 10 is a flowchart showing an example of a flow of processing at a time of illumination in mode 5 that is executed by the control section of the light source control device for a vehicle according to the second exemplary embodiment.

DETAILED DESCRIPTION

Herebelow, examples of exemplary embodiments of the present disclosure are described in detail with reference to the attached drawings.

First Exemplary Embodiment

Figure 1:
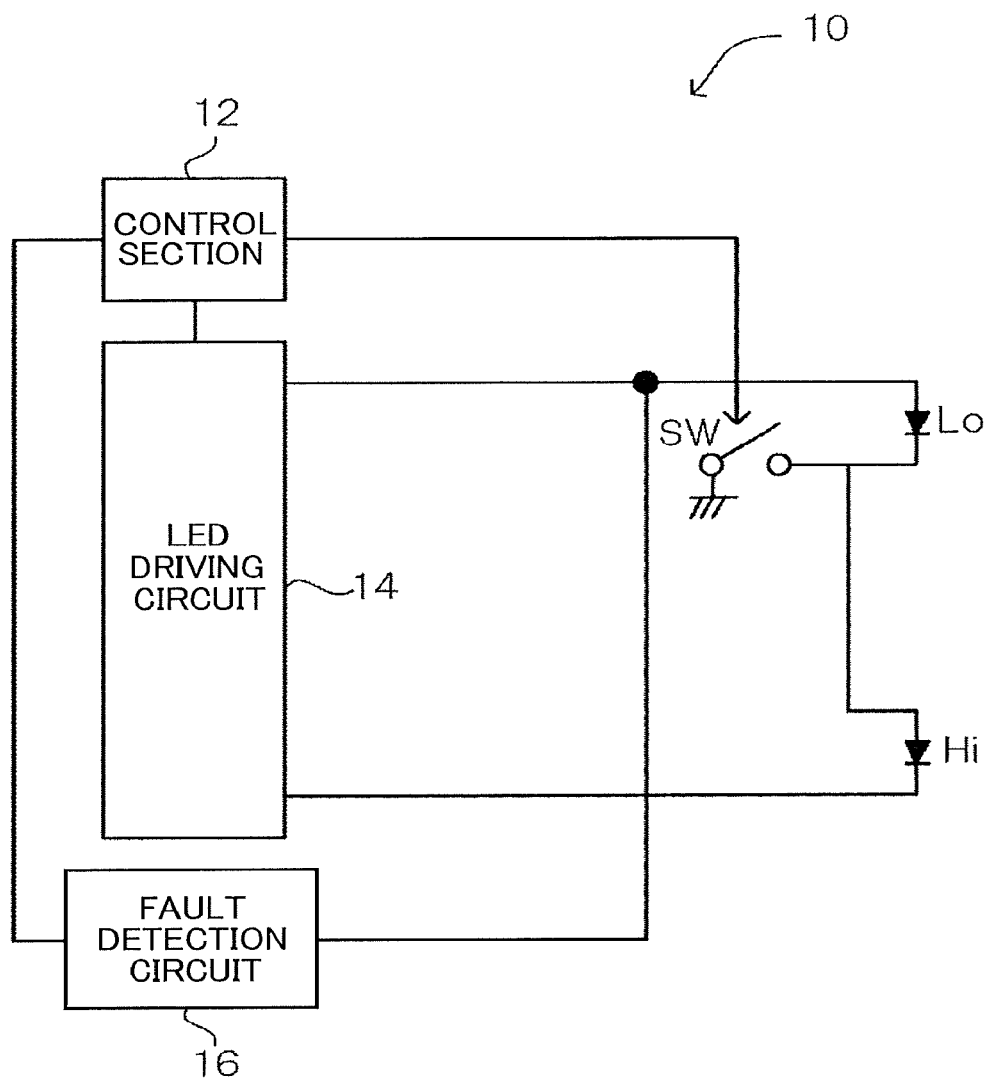
FIG. 1 is a diagram showing schematic structures of a light source control device for a vehicle according to a first exemplary embodiment.

FIG. 1 is a diagram showing schematic structures of a light source control device for a vehicle according to the present exemplary embodiment.

A light source control device for a vehicle 10 according to the present exemplary embodiment is equipped with two LED light sources that serve as plural light sources, and an LED driving circuit 14 that serves as a supply section.

One of the two light sources is configured as a low beam Lo that serves as a first light source, and the other is configured as a high beam Hi that serves as a second light source. The low beam Lo and the high beam Hi are connected in series. The two light sources are driven by electricity supplied by the single LED driving circuit 14.

The light source control device for a vehicle 10 is also equipped with a control section 12, which controls driving of the plural light sources, and a fault detection circuit 16, which serves as a fault detection section for detecting faults.

More specifically, an anode of the low beam Lo is connected to the LED driving circuit 14, a cathode of the low beam Lo is connected to an anode of the high beam Hi, and a cathode of the high beam Hi is connected to the LED driving circuit 14.

A change section and one end of a switch SW that serves as a first switch are connected to between the low beam Lo and the high beam Hi. The other end of the switch SW is connected to ground.

The fault detection circuit 16 is connected to between the low beam Lo and the LED driving circuit 14. The fault detection circuit 16 may detect a fault in the electricity supply path by detecting a current flowing from the LED driving circuit 14 to the low beam Lo, or the like.

The control section 12 is constituted by a microcomputer including a central processing unit (CPU), read-only memory (ROM), random access memory (RAM) and so forth. The switch SW, the LED driving circuit 14 and the fault detection circuit 16 are connected to the control section 12. The control section 12 loads a program pre-memorized in the ROM into the RAM and the CPU executes the program. Thus, in accordance with signals from operation switches that are not shown in the drawings, the control section 12 performs control to turn the switch SW on and off and control to supply electricity from the LED driving circuit 14 to the light sources. Thus, the low beam Lo is illuminated or the low beam Lo and the high beam Hi are illuminated concurrently. When the control section 12 illuminates the low beam Lo and the high beam Hi concurrently, if a fault is detected by the fault detection circuit 16, the control section 12 performs control to turn on the switch SW in order to recover the low beam Lo.

For example, when the low beam Lo and the high beam Hi are illuminated concurrently, the low beam Lo may be extinguished by a malfunction such as a disconnection or the like in the circuit at the high beam Hi side. Hence, when the control section 12 detects the fault with the fault detection circuit 16, the control section 12 performs control to turn on the switch SW. As a result, provided there is no malfunction in the circuit at the low beam Lo side, the low beam Lo may be recovered. When a fault is detected by the fault detection circuit 16, a report may be given by a reporting unit such as a warning lamp or display section incorporating details of the fault, or the like.

Figure 2:
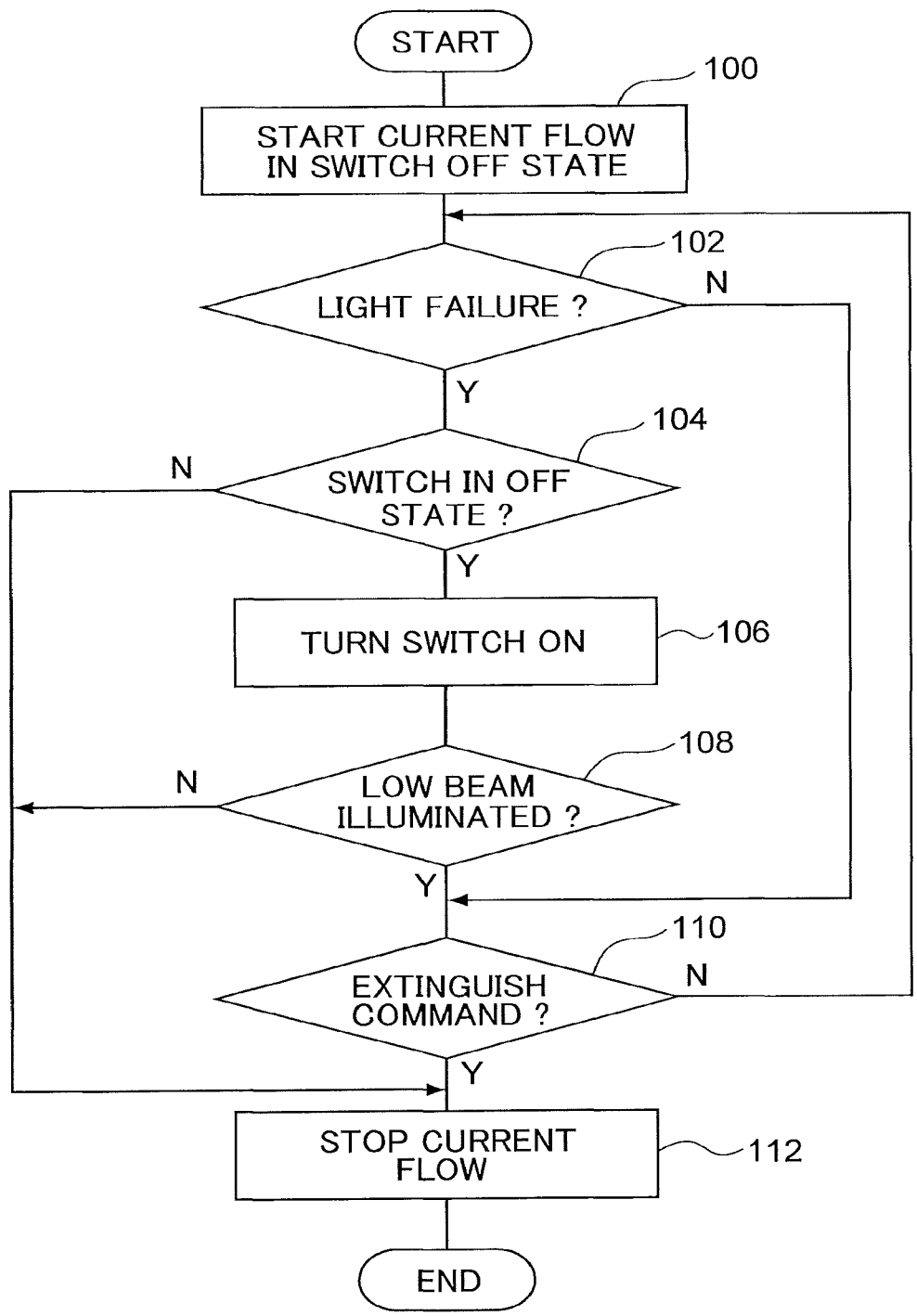
FIG. 2 is a flowchart showing an example of a flow of processing that is executed by a control section of the light source control device for a vehicle according to the first exemplary embodiment.

Now, specific processing that is carried out by the control section 12 of the light source control device for a vehicle 10 relating to the present exemplary embodiment structured as described above is described. FIG. 2 is a flowchart showing an example of a flow of processing that is executed by the control section of the light source control device for a vehicle according to the present exemplary embodiment. In these descriptions, the processing in FIG. 2 starts when concurrent illumination of the low beam Lo and the high beam Hi is commanded by an operation switch, which is not shown in the drawings.

In step 100, the control section 12 controls the switch SW and the LED driving circuit 14 so as to start a flow of current in a state in which the switch SW is off, and the control section 12 proceeds to step 102.

In step 102, the control section 12 makes a determination as to whether a fault has been detected by the fault detection circuit 16 and a light failure has occurred. This is, for example, a determination as to whether the fault detection circuit 16 detects a current flow between the LED driving circuit 14 and the low beam Lo or a state in which current is not flowing. If the result of this determination is affirmative, the control section 12 proceeds to step 104, and if the result is negative, the control section 12 proceeds to step 112.

In step 104, the control section 12 makes a determination as to whether the switch SW is in the off state. This is a determination as to whether the switch SW is in the off state due to the processing in step 106, which is described below, not having being executed yet. If the result of this determination is affirmative, the control section 12 proceeds to step 106, and if the result is negative, the control section 12 determines that there is a malfunction in the circuit at the low beam Lo side and proceeds to step 112.

In step 106, the control section 12 controls the switch SW to the on state and proceeds to step 110. Thus, the high beam Hi circuit is cut off and recovery of the low beam Lo is attempted.

In step 108, the control section 12 makes a determination as to whether the low beam Lo is illuminated. This is, for example, a determination as to whether the fault detection circuit 16 detects a flow of current. If the result of this determination is affirmative, the control section 12 proceeds to step 110, and if the result is negative, the control section 12 proceeds to step 112.

In step 110, the control section 12 makes a determination as to whether an extinguishing command has been given. This is a determination as to whether extinguishing has been commanded by an operation switch, which is not shown in the drawings. If the result of this determination is affirmative, the control section 12 proceeds to step 112, and if the result is negative, the control section 12 returns to step 102 and repeats the processing described above.

In step 112, the control section 12 performs control so as to stop current flowing from the LED driving circuit 14, and ends this sequence of processing. When the flow of current is stopped due to a fault, the occurrence of this fault may be reported by a reporting unit such as a warning lamp or the like.

Figure 3A:
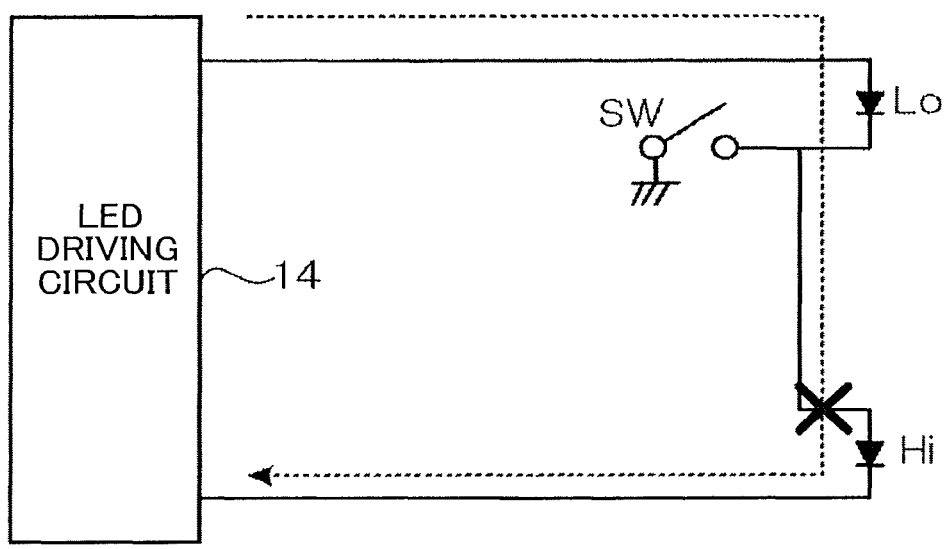
FIG. 3A is a diagram showing a situation, during concurrent illumination of a low beam and a high beam in the light source control device for a vehicle according to the first exemplary embodiment, in which a fault has occurred due to a disconnection or the like in a high beam side circuit.
Figure 3B:
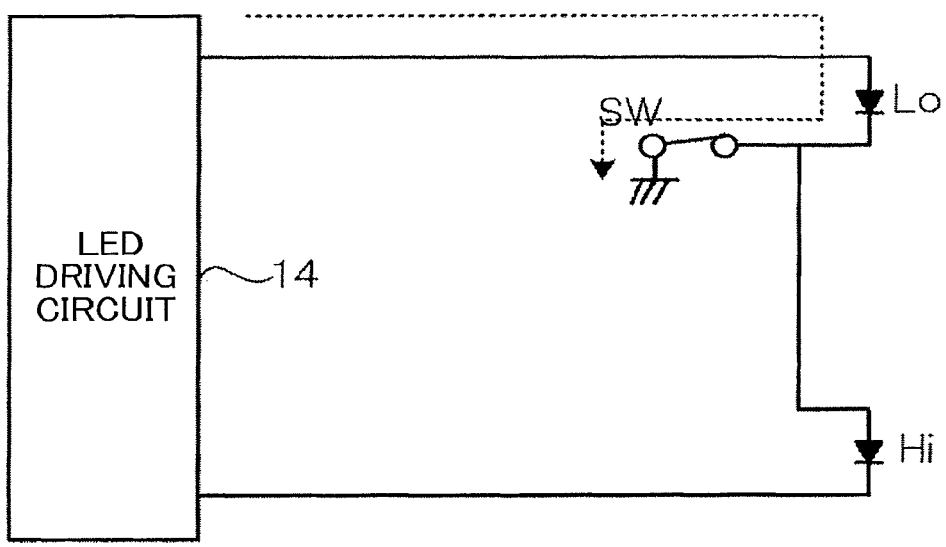
FIG. 3B is a diagram showing a situation in the light source control device for a vehicle according to the first exemplary embodiment in which a switch has been turned on and the low beam recovered.

Thus, in the present exemplary embodiment, the low beam Lo and the high beam Hi are connected in series and the switch SW, of which one end is grounded, is provided between the low beam Lo and high beam Hi. Thus, even if there is a light failure while the light sources are illuminated concurrently, the low beam Lo may be recovered. If, for example, a fault occurs due to a disconnection or the like in the circuit at the high beam Hi side while the light sources are illuminated concurrently (FIG. 3A), the low beam Lo and the high beam Hi will both be extinguished but, as shown in FIG. 3B, the low beam Lo may be recovered by turning on the switch SW.

In the present exemplary embodiment, the first switch SW of which one end is connected to between the low beam Lo and the high beam Hi and the other end is connected to ground is described as an example of the change section, but this is not limiting. A structure that changes the path along which electricity is supplied is sufficient. For example, a switch of which one end is connected to between the low beam Lo and the high beam Hi and the other end is connected to between the high beam Hi and the LED driving circuit 14 may be employed.

Second Exemplary Embodiment

Figure 4:
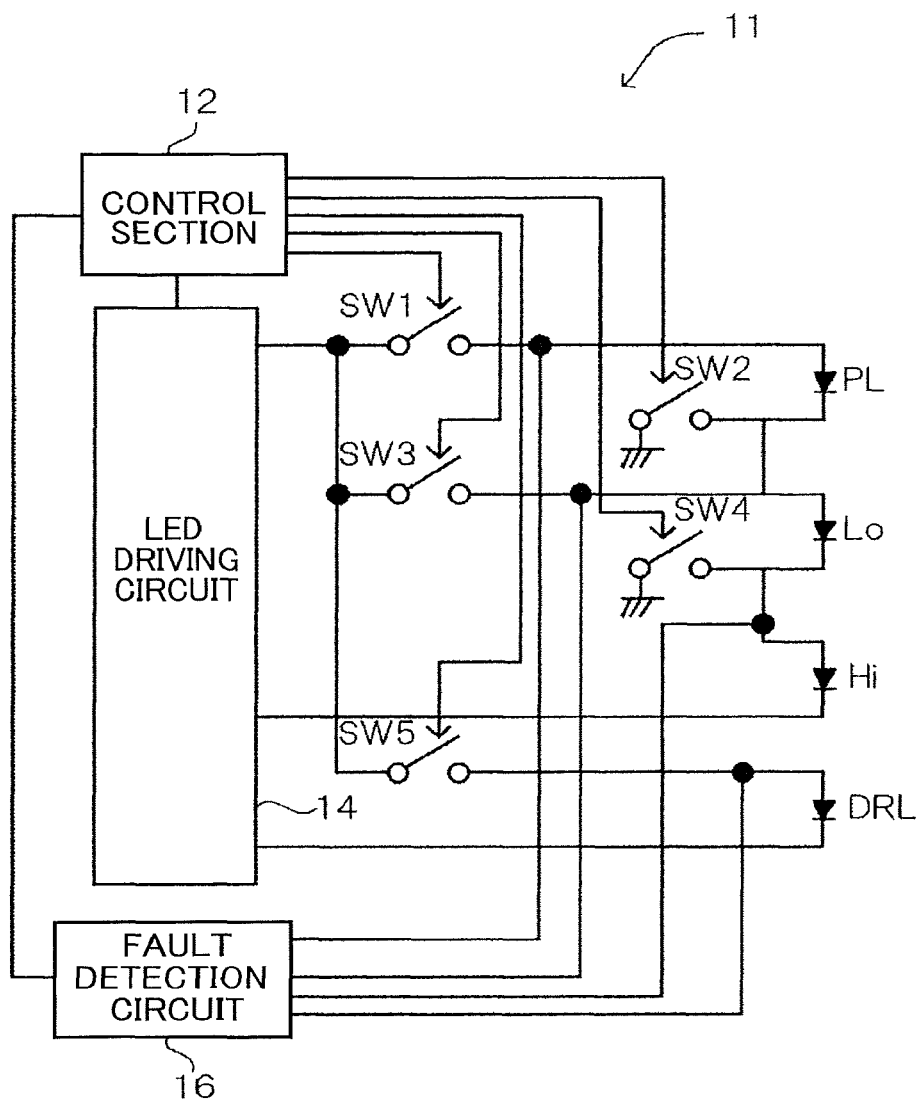
FIG. 4 is a diagram showing schematic structures of a light source control device for a vehicle according to a second exemplary embodiment.

Now, a light source control device for a vehicle according to a second exemplary embodiment is described. FIG. 4 is a diagram showing schematic structures of the light source control device for a vehicle according to the present exemplary embodiment. Structures that are the same as in the first exemplary embodiment are assigned the same reference symbols and are not described here.

A light source control device for a vehicle 11 according to the present exemplary embodiment is equipped with four LED light sources that serve as the plural light sources and the LED driving circuit 14. The four LED light sources that the present exemplary embodiment is equipped with are a position lamp PL that serves as a third light source, the low beam Lo, the high beam Hi, and a daytime running light DRL.

The position lamp PL, the low beam Lo and the high beam Hi can be connected in series. These three light sources are driven by electricity supplied by the single LED driving circuit 14. The daytime running light DRL is connected to the LED driving circuit 14 in parallel with those three light sources. The daytime running light DRL is also driven by electricity supplied by the LED driving circuit 14.

Similarly to the first exemplary embodiment, the light source control device for a vehicle 11 is equipped with the control section 12 that controls driving of the plural light sources and the fault detection circuit 16 that detects faults.

More specifically, an anode of the position lamp PL is connected to the LED driving circuit 14 and a cathode of the position lamp PL is connected to the anode of the low beam Lo. The cathode of the low beam Lo is connected to the anode of the high beam Hi, and the cathode of the high beam Hi is connected to the LED driving circuit 14.

Switches SW1 to SW5 are provided at the upstream sides and downstream sides of the light sources, and may connect the respective light sources in parallel. More specifically, the switch SW1, which serves as a second switch, is connected to between the LED driving circuit 14 and the position lamp PL. One end of the switch SW2, which serves as a fourth switch, is connected to between the position lamp PL and the low beam Lo, and the other end is connected to ground. One end of the switch SW3, which serves as a third switch, is connected to between the LED driving circuit 14 and the switch SW1, and the other end is connected to the anode of the low beam Lo. One end of the switch SW4, which serves as a first switch, is connected to between the low beam Lo and the high beam Hi, and the other end is connected to ground. One end of the switch SW5 is connected to between the LED driving circuit 14 and the switch SW1, and the other end is connected to the anode of the daytime running light DRL.

The fault detection circuit 16 is connected to, respectively, between the switch SW1 and the position lamp PL, between the switch SW3 and the low beam Lo, between the low beam Lo and the high beam Hi, and between the switch SW5 and the daytime running light DRL. The fault detection circuit 16 may detect a fault in the electricity supply path by detecting currents at these connections or the like.

The control section 12 is constituted by the microcomputer including the central processing unit (CPU), the read-only memory (ROM), the random access memory (RAM) and so forth. The switches SW1 to SW5, the LED driving circuit 14 and the fault detection circuit 16 are connected to the control section 12. The control section 12 loads a program pre-memorized in the ROM into the RAM and the CPU executes the program. Thus, in accordance with signals from operation switches that are not shown in the drawings, the control section 12 performs control to turn the switches SW1 to SW5 on and off and controls the electricity supply from the LED driving circuit 14 to the light sources. Thus, illumination of the light sources (the position lamp PL, the low beam Lo, the high beam Hi and the daytime running light DRL) is controlled.

Now, an example of a plural number of modes that the control section 12 may realize by on/off control of the switches SW1 to SW5 is described.

To be specific, in the present exemplary embodiment, illumination in the six modes illustrated in FIG. 5 is enabled. FIG. 5 is a table showing illumination states and switching states of the light sources in the respective modes of the light source control device for a vehicle 11 according to the present exemplary embodiment.

In mode 1, the switch SW1 and the switch SW2 are turned on and the other switches are turned off. Thus, only the position lamp PL is illuminated.

In mode 2, the switch SW3 and the switch SW4 are turned on and the other switches are turned off. Thus, only the low beam is illuminated.

In mode 3, the switch SW1 and the switch SW4 are turned on and the other switches are turned off. Thus, the position lamp PL and the low beam Lo are illuminated concurrently.

In mode 4, only the switch SW3 is turned on and the other switches are turned off. Thus, the low beam Lo and the high beam Hi are illuminated concurrently.

In mode 5, only the switch SW1 is turned on and the other switches are turned off. Thus, the position lamp PL, the low beam Lo and the high beam Hi are illuminated concurrently.

In mode 6, only the switch SW5 is turned on and the other switches are turned off. Thus, only the daytime running light DRL is illuminated.

Because the daytime running light DRL is connected in parallel with the other light sources, the daytime running light DRL may also be turned on in any of the above modes 1 to 5.

On the basis of fault detection results from the fault detection circuit 16, the control section 12 may perform control to assure current paths to prevent the extinguishing of light sources other than a faulty light source. When the control section 12 performs control to assure current paths to prevent extinguishing of light sources, the control section 12 controls the switches SW1 to SW5 in a sequence prioritizing recovery of the low beam Lo that is the first light source. When a fault is detected by the fault detection circuit 16, a report may be given by a reporting unit such as a warning lamp or display section incorporating details of the fault, or the like.

Examples of this control to assure current paths so as to prevent extinguishing of light sources other than a faulty light source include control during illumination in mode 3, control during illumination in mode 4, and control during illumination in mode 5.

If a fault is detected in control in mode 3, in which the position lamp PL and the low beam Lo are illuminated concurrently, then in order to implement a recovery prioritizing the low beam Lo circuit, illumination in mode 2 is attempted. If the low beam Lo does not recover in mode 2, illumination in mode 1 is applied.

If a fault is detected in control in mode 4, in which the low beam Lo and the high beam Hi are illuminated concurrently, then in order to implement a recovery prioritizing the low beam Lo circuit, illumination in mode 2 is applied.

If a fault is detected in control in mode 5, in which the position lamp PL, the low beam Lo and the high beam Hi are illuminated concurrently, then in order to implement a recovery prioritizing the low beam Lo circuit, illumination in mode 3 is attempted first. If the low beam Lo does not recover in mode 3, illumination in mode 4 is attempted next. If the low beam Lo does not recover in mode 4, illumination in mode 1 is applied. Note that illumination in mode 4 may be attempted and then illumination in mode 3 applied.

Now, specific processing that is carried out by the control section 12 of the light source control device for a vehicle 11 relating to the present exemplary embodiment structured as described above is described.

First, control at a time of illumination in the aforementioned mode 3 is described. FIG. 6 is a flowchart showing an example of a flow of processing at a time of illumination in mode 3 that is executed by the control section 12 of the light source control device for a vehicle 11 according to the present exemplary embodiment. In these descriptions, the processing of FIG. 6 starts when illumination in mode 3 is commanded by an operation switch that is not shown in the drawings.

In step 200, the control section 12 controls the switching state to mode 3; that is, the control section 12 turns on the switch SW1 and the switch SW4 and turns off the other switches. The control section 12 starts a flow of current from the LED driving circuit 14, and proceeds to step 202.

Figure 7A:
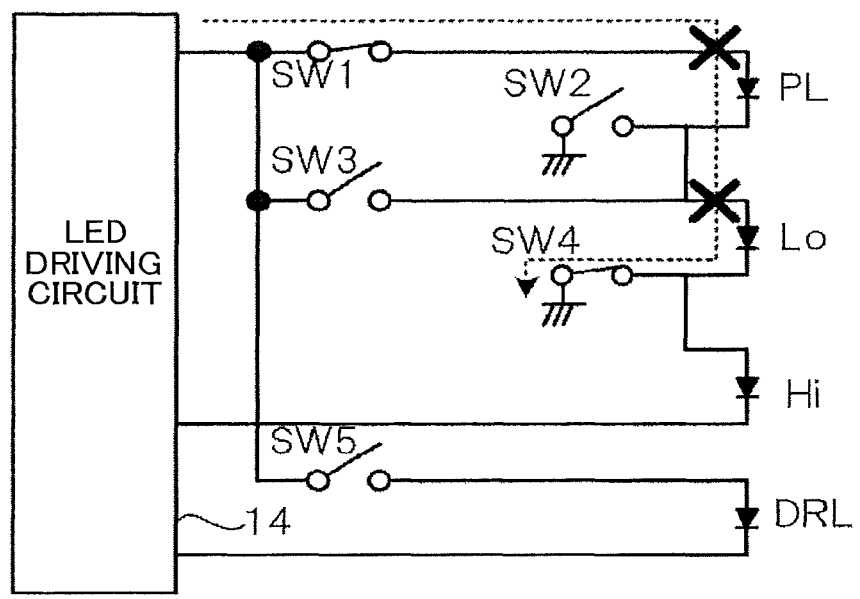
FIG. 7A is a diagram for describing fault detection in mode 3.

In step 202, the control section 12 makes a determination as to whether a fault has been detected in mode 3. This determination as to whether a fault is detected in mode 3 is based on determining whether a malfunction has occurred in one or both of the position lamp PL circuit and the low beam Lo circuit, as illustrated in FIG. 7A, and the fault detection circuit 16 has detected an absence of current. If the result of this determination is affirmative, the control section 12 proceeds to step 204, and if the result is negative, the control section 12 proceeds to step 216.

In step 204, the control section 12 makes a determination as to whether the switching state has not yet changed to mode 2. This is a determination as to whether the change to mode 2 in step 206, which is described below, is yet to be applied. If the result of this determination is affirmative, the control section 12 proceeds to step 206, and if the result is negative, the control section 12 proceeds to step 208.

Figure 7B:
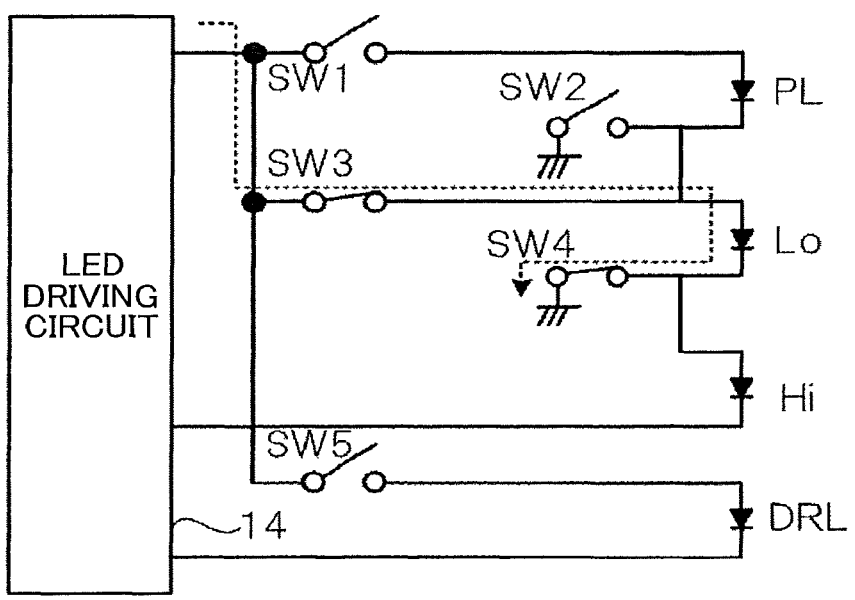
FIG. 7B is a diagram depicting a situation after a change from mode 3 to mode 2.

In step 206, the control section 12 controls the switching state to mode 2; that is, the control section 12 turns on the switch SW3 and the switch SW4 and turns off the other switches, and then proceeds to step 208. Thus, as shown in FIG. 7B, the switching state changes from mode 3 to mode 2, the position lamp PL circuit is cut off, and a recovery prioritizing the low beam Lo is attempted. Thus, provided there is no malfunction in the circuit of the low beam Lo, the low beam Lo may be recovered.

In step 208, the control section 12 makes a determination as to whether a light failure of the low beam Lo has been detected. This is a determination as to whether an absence of current has been detected by the fault detection circuit 16 in the switching state of mode 2. If the result of this determination is affirmative, the control section 12 proceeds to step 210, and if the result is negative, the control section 12 proceeds to step 216.

In step 210, the control section 12 makes a determination as to whether the switching state has not yet changed to mode 1. This is a determination as to whether the change to mode 1 in step 212, which is described below, is yet to be applied. If the result of this determination is affirmative, the control section 12 proceeds to step 212, and if the result is negative, the control section 12 proceeds to step 214.

Figure 7C:
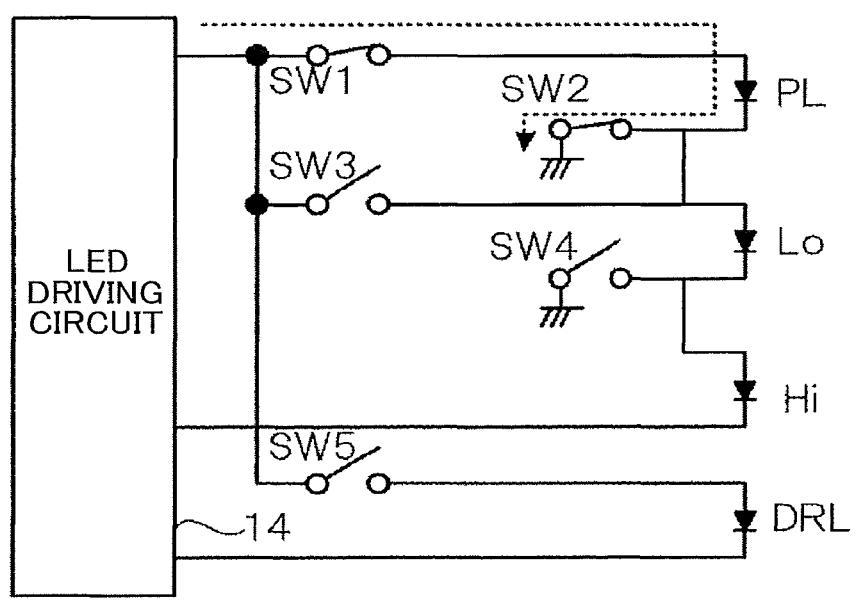
FIG. 7C is a diagram depicting a situation after a change from mode 2 to mode 1.

In step 212, the control section 12 controls the switching state to mode 1; that is, the control section 12 turns on the switch SW1 and the switch SW2 and turns off the other switches, and then proceeds to step 214. Thus, as shown in FIG. 7C, the switching state changes from mode 2 to mode 1, and a recovery prioritizing the position lamp PL is attempted. In the present exemplary embodiment, a recovery of the position lamp PL alone is attempted when the low beam Lo does not recover. Thus, provided there is no malfunction in the circuit of the position lamp PL, the position lamp PL may be recovered.

In step 214, the control section 12 makes a determination as to whether a light failure of the position lamp PL has been detected. This is a determination as to whether an absence of current has been detected by the fault detection circuit 16 in the switching state of mode 1. If the result of this determination is negative, the control section 12 proceeds to step 216, and if the result is affirmative, the control section 12 proceeds to step 218.

In step 216, the control section 12 makes a determination as to whether an extinguishing command has been given. This is a determination as to whether extinguishing has been commanded by an operation switch, which is not shown in the drawings. If the result of this determination is affirmative, the control section 12 proceeds to step 222, and if the result is negative, the control section 12 proceeds to step 218.

In step 218, the control section 12 makes a determination as to whether the switching state is in mode 1. This is a determination as to whether the switching state has been changed to mode 1 by step 212. If the result of this determination is affirmative, the control section 12 proceeds to the above-described step 214, and if the result is negative, the control section 12 proceeds to step 220.

In step 220, the control section 12 makes a determination as to whether the switching state is in mode 2. This is a determination as to whether the switching state has been changed to mode 2 by step 206. If the result of this determination is affirmative, the control section 12 proceeds to step 208, and if the result is negative, the control section 12 returns to step 202 and repeats the processing described above.

In step 222, the control section 12 performs control so as to stop current flowing from the LED driving circuit 14, and ends this sequence of processing. When the flow of current is stopped due to a fault, the occurrence of this fault may be reported by a reporting unit such as a warning lamp or the like.

Now, control at a time of illumination in the aforementioned mode 4 is described. FIG. 8 is a flowchart showing an example of a flow of processing at a time of illumination in mode 4 that is executed by the control section 12 of the light source control device for a vehicle 11 according to the present exemplary embodiment. In these descriptions, the processing of FIG. 8 starts when illumination in mode 4 is commanded by an operation switch that is not shown in the drawings.

In step 300, the control section 12 controls the switching state to mode 4; that is, the control section 12 turns on the switch SW3 and turns off the other switches. The control section 12 starts a flow of current from the LED driving circuit 14, and proceeds to step 302.

Figure 9A:
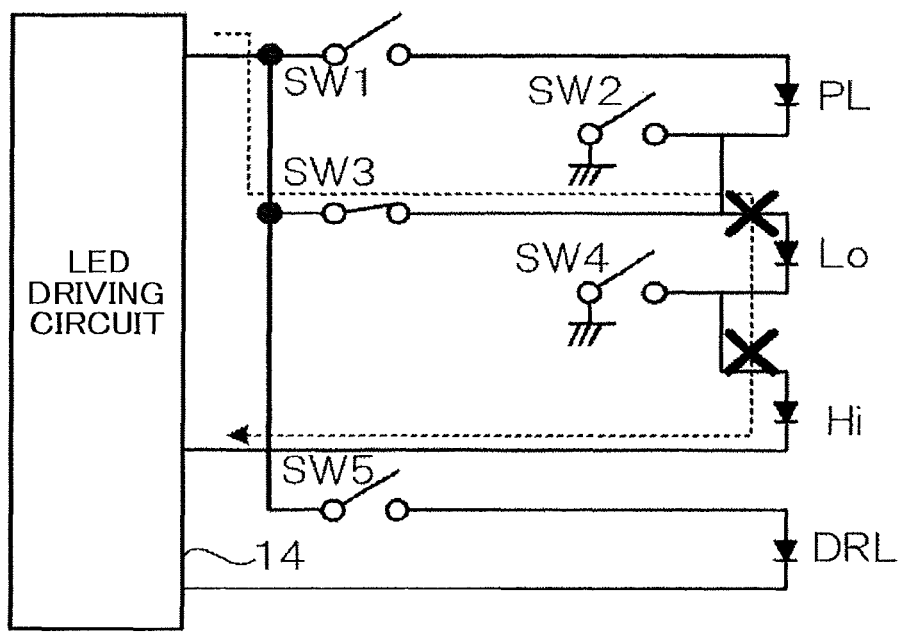
FIG. 9A is a diagram for describing fault detection in mode 4.

In step 302, the control section 12 makes a determination as to whether a fault has been detected in mode 4. This determination as to whether a fault is detected in mode 4 is based on determining whether a malfunction has occurred in one or both of the low beam Lo circuit and the high beam Hi circuit, as illustrated in FIG. 9A, and the fault detection circuit 16 has detected an absence of current. If the result of this determination is affirmative, the control section 12 proceeds to step 304, and if the result is negative, the control section 12 proceeds to step 310.

In step 304, the control section 12 makes a determination as to whether the switching state has not yet changed to mode 2. This is a determination as to whether the change to mode 2 in step 306, which is described below, is yet to be applied. If the result of this determination is affirmative, the control section 12 proceeds to step 306, and if the result is negative, the control section 12 proceeds to step 308.

Figure 9B:
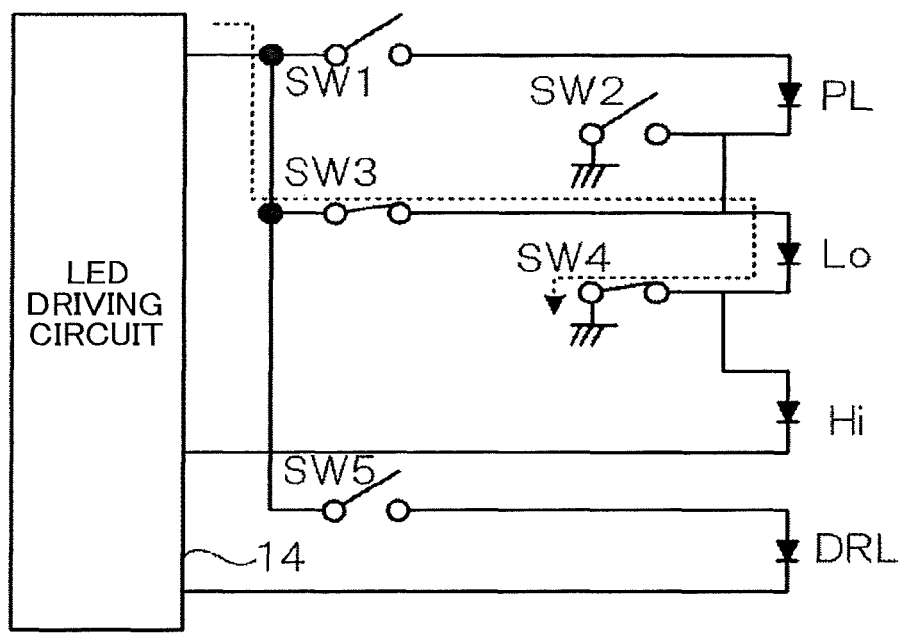
FIG. 9B is a diagram depicting a situation after a change from mode 4 to mode 2.

In step 306, the control section 12 controls the switching state to mode 2; that is, the control section 12 turns on the switch SW3 and the switch SW4 and turns off the other switches, and then proceeds to step 308. Thus, as shown in FIG. 9B, the switching state changes from mode 4 to mode 2, the high beam Hi circuit is cut off, and a recovery prioritizing the low beam Lo is attempted. Thus, provided there is no malfunction in the circuit of the low beam Lo, the low beam Lo may be recovered.

In step 308, the control section 12 makes a determination as to whether a light failure of the low beam Lo has been detected. This is a determination as to whether an absence of current has been detected by the fault detection circuit 16 in the switching state of mode 2. If the result of this determination is negative, the control section 12 proceeds to step 310, and if the result is affirmative, the control section 12 proceeds to step 312.

In step 310, the control section 12 makes a determination as to whether an extinguishing command has been given. This is a determination as to whether extinguishing has been commanded by an operation switch, which is not shown in the drawings. If the result of this determination is affirmative, the control section 12 proceeds to step 312, and if the result is negative, the control section 12 returns to step 302 and repeats the processing described above.

In step 312, the control section 12 performs control so as to stop current flowing from the LED driving circuit 14, and ends this sequence of processing. When the flow of current is stopped due to a fault, the occurrence of this fault may be reported by a reporting unit such as a warning lamp or the like.

Now, control at a time of illumination in the aforementioned mode 5 is described. FIG. 10 is a flowchart showing an example of a flow of processing at a time of illumination in mode 5 that is executed by the control section 12 of the light source control device for a vehicle 11 according to the present exemplary embodiment. In these descriptions, the processing of FIG. 10 starts when illumination in mode 5 is commanded by an operation switch that is not shown in the drawings. In the processing in FIG. 10, an example is described in which, when a fault in mode 5 is detected, illumination in mode 3 is attempted and then illumination in mode 4 is applied. However, as mentioned above, illumination in mode 4 may be attempted and then illumination in mode 3 applied.

In step 400, the control section 12 controls the switching state to mode 5; that is, the control section 12 turns on the switch SW1 and turns off the other switches. The control section 12 starts a flow of current from the LED driving circuit 14, and proceeds to step 402.

Figure 11A:
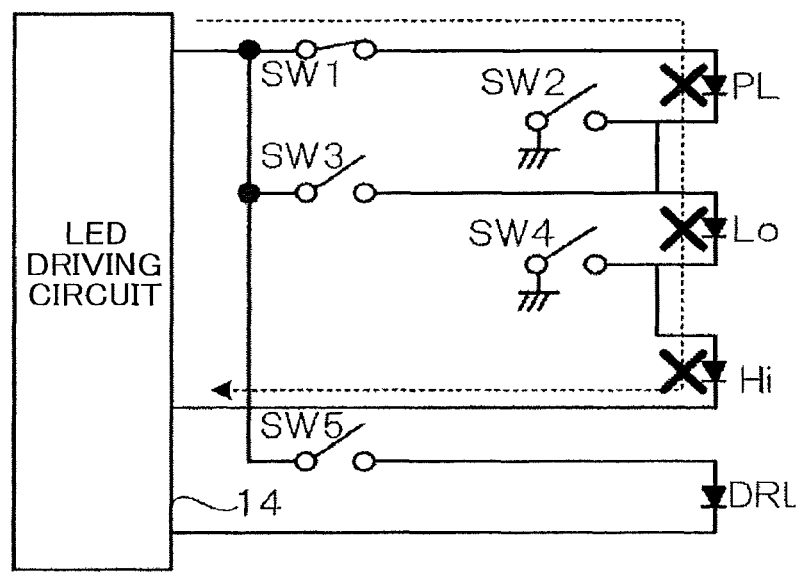
FIG. 11A is a diagram for describing fault detection in mode 5.

In step 402, the control section 12 makes a determination as to whether a fault has been detected in mode 5. This determination as to whether a fault is detected in mode 5 is based on determining whether a malfunction has occurred in one or more of the position lamp PL circuit, the low beam Lo circuit and the high beam Hi circuit, as illustrated in FIG. 11A, and the fault detection circuit 16 has detected an absence of current. If the result of this determination is affirmative, the control section 12 proceeds to step 404, and if the result is negative, the control section 12 proceeds to step 422.

In step 404, the control section 12 makes a determination as to whether the switching state has not yet changed to mode 3. This is a determination as to whether the change to mode 3 in step 406, which is described below, is yet to be applied. If the result of this determination is affirmative, the control section 12 proceeds to step 406, and if the result is negative, the control section 12 proceeds to step 408.

Figure 11B:
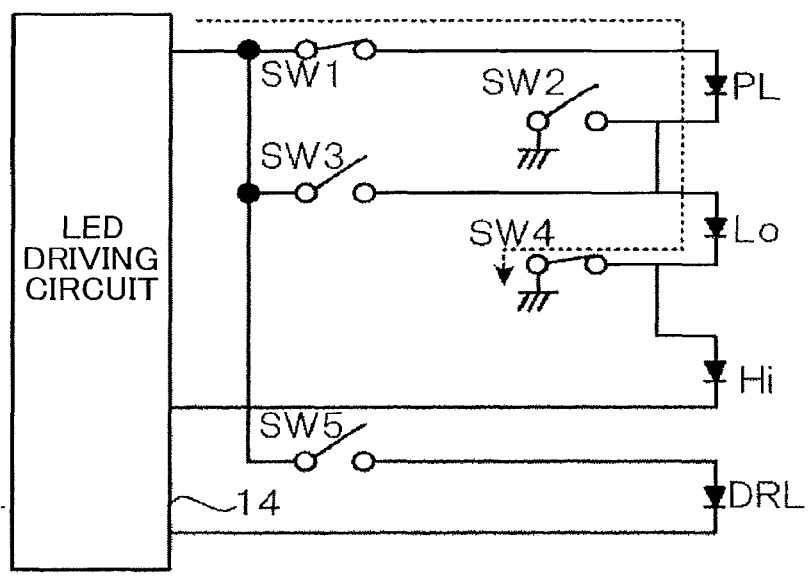
FIG. 11B is a diagram depicting a situation after a change from mode 5 to mode 3.

In step 406, the control section 12 controls the switching state to mode 3; that is, the control section 12 turns on the switch SW1 and the switch SW4 and turns off the other switches, and then proceeds to step 408. Thus, as shown in FIG. 11B, the switching state changes from mode 5 to mode 3, the high beam Hi circuit is cut off, and a recovery prioritizing the position lamp PL and the low beam Lo is attempted. Thus, provided there is no malfunction in the circuits of the position lamp PL and the low beam Lo, the low beam Lo may be recovered.

In step 408, the control section 12 makes a determination as to whether a light failure of the low beam Lo has been detected. This is a determination as to whether an absence of current has been detected by the fault detection circuit 16 in the switching state of mode 3. If the result of this determination is affirmative, the control section 12 proceeds to step 410, and if the result is negative, the control section 12 proceeds to step 422.

In step 410, the control section 12 makes a determination as to whether the switching state has not yet changed to mode 4. This is a determination as to whether the change to mode 4 in step 412, which is described below, is yet to be applied. If the result of this determination is affirmative, the control section 12 proceeds to step 412, and if the result is negative, the control section 12 proceeds to step 414.

Figure 11C:
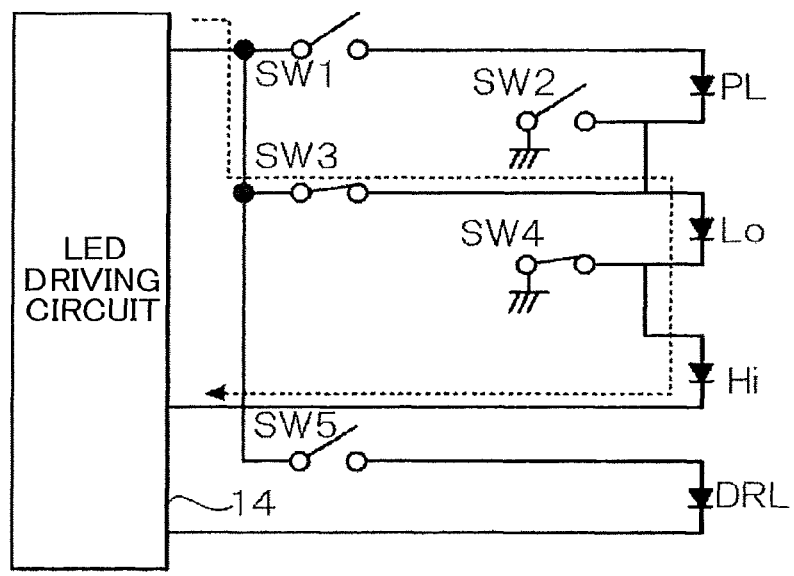
FIG. 11C is a diagram depicting a situation after a change from mode 3 to mode 4.

In step 412, the control section 12 controls the switching state to mode 4; that is, the control section 12 turns on the switch SW3 and turns off the other switches, and then proceeds to step 414. Thus, as shown in FIG. 11C, the switching state changes from mode 3 to mode 4, the circuit of the position lamp PL is cut off, and a recovery prioritizing the low beam Lo and the high beam Hi is attempted. Thus, provided there is no malfunction in the circuits of the low beam Lo and the high beam Hi, the low beam Lo may be recovered.

In step 414, the control section 12 makes a determination as to whether a light failure of the low beam Lo has been detected. This is a determination as to whether an absence of current has been detected by the fault detection circuit 16 in the switching state of mode 4. If the result of this determination is affirmative, the control section 12 proceeds to step 416, and if the result is negative, the control section 12 proceeds to step 422.

In step 416, the control section 12 makes a determination as to whether the switching state has not yet changed to mode 1. This is a determination as to whether the change to mode 1 in step 418, which is described below, is yet to be applied. If the result of this determination is affirmative, the control section 12 proceeds to step 418, and if the result is negative, the control section 12 proceeds to step 420.

Figure 11D:
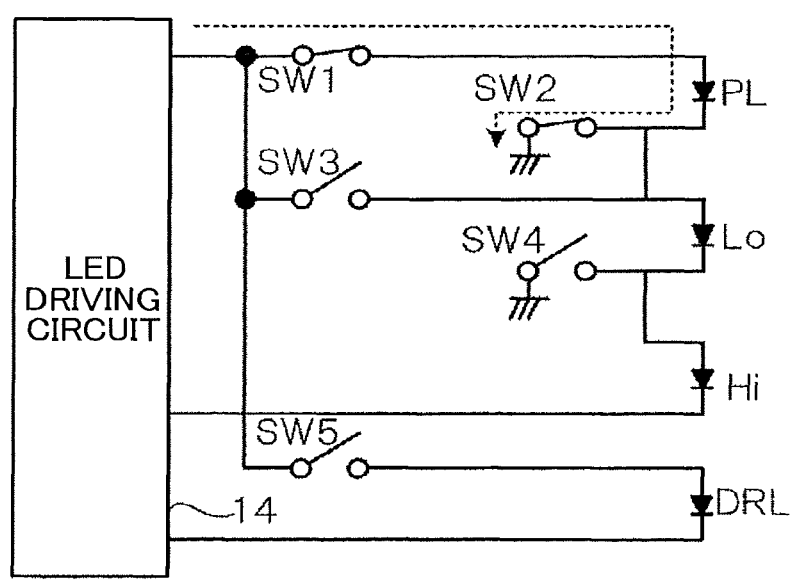
FIG. 11D is a diagram depicting a situation after a change from mode 4 to mode 1.

In step 418, the control section 12 controls the switching state to mode 1; that is, the control section 12 turns on the switch SW1 and the switch SW2 and turns off the other switches, and then proceeds to step 420. Thus, as shown in FIG. 11D, the switching state changes from mode 4 to mode 1, and a recovery prioritizing the position lamp PL is attempted. In the present exemplary embodiment, a recovery of the position lamp PL alone is attempted when the low beam Lo does not recover. Thus, provided there is no malfunction in the circuit of the position lamp PL, the position lamp PL may be recovered.

In step 420, the control section 12 makes a determination as to whether a light failure of the position lamp PL has been detected. This is a determination as to whether an absence of current has been detected by the fault detection circuit 16 in the switching state of mode 1. If the result of this determination is negative, the control section 12 proceeds to step 422, and if the result is affirmative, the control section 12 proceeds to step 424.

In step 422, the control section 12 makes a determination as to whether an extinguishing command has been given. This is a determination as to whether extinguishing has been commanded by an operation switch, which is not shown in the drawings. If the result of this determination is affirmative, the control section 12 proceeds to step 430, and if the result is negative, the control section 12 proceeds to step 424.

In step 424, the control section 12 makes a determination as to whether the switching state is in mode 1. This is a determination as to whether the switching state has been changed to mode 1 by step 418. If the result of this determination is affirmative, the control section 12 proceeds to step 420, and if the result is negative, the control section 12 proceeds to step 426.

In step 426, the control section 12 makes a determination as to whether the switching state is in mode 4. This is a determination as to whether the switching state has been changed to mode 4 by step 412. If the result of this determination is affirmative, the control section 12 proceeds to step 414, and if the result is negative, the control section 12 proceeds to step 428.

In step 428, the control section 12 makes a determination as to whether the switching state is in mode 3. This is a determination as to whether the switching state has been changed to mode 3 by step 406. If the result of this determination is affirmative, the control section 12 proceeds to step 408, and if the result is negative, the control section 12 returns to step 402 and repeats the processing described above.

In step 430, the control section 12 performs control so as to stop current flowing from the LED driving circuit 14, and ends this sequence of processing. When the flow of current is stopped due to a fault, the occurrence of this fault may be reported by a reporting unit such as a warning lamp or the like.

In the present exemplary embodiment, the switches SW1 to SW5 are provided at the upstream sides and downstream sides of the plural light sources that are connected in series, and may connect the respective light sources in parallel. Thus, when a fault occurs, a recovery prioritizing the low beam Lo may be implemented.

In the second exemplary embodiment, only the daytime running light DRL is connected in parallel with the other light sources; this structure may be omitted. Alternatively, a mode is possible in which the daytime running light DRL is connected in series with the other light sources and may be changed to a parallel connection.

In the exemplary embodiments described above, the fault detection circuit 16 and the control section 12 are recited as being separate, but this is not limiting. The functions of the fault detection circuit 16 and the control section 12 may be realized by a single module.

The processing that is executed by the control section 12 according to the exemplary embodiments described above is described as being software processing that is implemented by a program being executed, but the processing may be implemented in hardware. Alternatively, the processing may combine both software and hardware. Further, if the processing is implemented in software, the program may be memorized in any of various storage media and distributed.

The present disclosure is not limited by the above recitations. In addition to the above recitations, it will be clear that numerous modifications may be embodied within a technical scope not departing from the gist of the disclosure.

What is claimed is:

1. A light source control device for a vehicle, comprising:
a plurality of light sources connected in series;
a supply section that supplies electricity to the plurality of light sources;
a change section that changes a supply path along which electricity is supplied from the supply section to the plurality of light sources;
a fault detection section that detects a fault in the supply path; and
a control section that, when a fault is detected by the fault detection section in a state in which the plurality of the light sources are illuminated concurrently, performs a plurality of recovery attempts of at least one prioritized light source by sequentially supplying current along a plurality of different current supply paths while testing for light failure of the at least one prioritized light source.

2. The light source control device for a vehicle according to claim 1, wherein:
the plurality of light sources includes
a first light source that is illuminated by electricity supplied from the supply section, and
a second light source that is connected in series with the first light source and is illuminated by electricity supplied from the supply section; and
the change section includes a first switch of which one end is connected to between the first light source and the second light source and another end is connected to ground.

3. The light source control device for a vehicle according to claim 2, wherein:
the plurality of light sources further includes a third light source that is connected in series with the first light source and is illuminated by electricity supplied from the supply section; and
the change section further includes
a second switch provided between the supply section and an electricity supply path upstream side of the third light source,
a third switch provided between the supply section and an electricity supply path upstream side of the first light source, and
a fourth switch of which one end is connected to between the first light source and the third light source and another end is connected to ground.

4. The light source control device for a vehicle according to claim 3, wherein,
in response to a pre-specified illumination command, the control section performs control to turn each of the first switch, second switch, third switch and fourth switch on or off and controls the electricity supply path from the supply section, and
when a fault is detected by the fault detection section in the state in which the plurality of the light sources are illuminated concurrently, the control section implements recovery control of the light sources by performing control to turn each of the first switch, second switch, third switch and fourth switch on or off and implements recovery control of the light sources, prioritizing recovery of at least the first light source.

5. The light source control device for a vehicle according to claim 4, wherein, when a fault is detected by the fault detection section in a state in which the first switch and the second switch are both on and the other switches are off and the first light source and third light source are illuminated concurrently, the control section performs control to turn off the second switch and turn on the third switch and implements recovery control of the first light source.

6. The light source control device for a vehicle according claim 1, wherein,
in response to a pre-specified illumination command, the control section controls the change section and controls the electricity supply path from the supply section, and
when a fault is detected by the fault detection section in the state in which the plurality of the plurality of light sources are illuminated concurrently, the control section controls the change section so as to change the supply path.

7. The light source control device for a vehicle according to claim 2, wherein,
in response to an illumination command, the control section turns the first switch on or off and controls the electricity supply path from the supply section, and
when a fault is detected by the fault detection section in [a state in which the first switch has been controlled to turn off and the first light source and second light source are illuminated concurrently, the control section performs control to turn on the first switch.

8. The light source control device for a vehicle according to claim 2, wherein the first light source is a low beam and the second light source is a high beam.

9. A non-transitory computer-readable storage medium storing a light source control program for a vehicle, causing a computer to function as the control section of the light source control device for a vehicle according to claim 4.

10. A light source control device for a vehicle, comprising:
a plurality of light sources connected in series;
a supply section that supplies electricity to the plurality of light sources;
a change section that changes a supply path along which electricity is supplied from the supply section to the plurality of light sources;
a fault detection section that detects a fault in the supply path; and
a control section that, when a fault is detected by the fault detection section in a state in which the plurality of the light sources are illuminated concurrently, attempts to recover at least one light source by controlling the change section to select a plurality of current supply paths in a sequence that prioritizes recovery of the at least one light source; wherein:
the plurality of light sources includes
a first light source that is illuminated by electricity supplied from the supply section, and
a second light source that is connected in series with the first light source and is illuminated by electricity supplied from the supply section;
the change section includes a first switch of which one end is connected to between the first light source and the second light source and another end is connected to ground;
the plurality of light sources further includes a third light source that is connected in series with the first light source and is illuminated by electricity supplied from the supply section; and the change section further includes
- a second switch provided between the supply section and an electricity supply path upstream side of the third light source,
- a third switch provided between the supply section and an electricity supply path upstream side of the first light source, and
- a fourth switch of which one end is connected to between the first light source and the third light source and another end is connected to ground;

in response to a pre-specified illumination command, the control section performs control to turn each of the first switch, second switch, third switch and fourth switch on or off and controls the electricity supply path from the supply section, and when a fault is detected by the fault detection section in the state in which the plurality of the light sources are illuminated concurrently, the control section implements recovery control of the light sources by performing control to turn each of the first switch, second switch, third switch and fourth switch on or off and implements recovery control of the light sources, prioritizing recovery of at least the first light source;

when a fault is detected by the fault detection section in a state in which the first switch and the second switch are both on and the other switches are off and the first light source and third light source are illuminated concurrently, the control section performs control to turn off the second switch and turn on the third switch and implements recovery control of the first light source; and when a fault is detected by the fault detection section after the recovery control of the first light source, the control section performs control to turn on the second switch and fourth switch and turn off the first switch and third switch and implements recovery control of the third light source.

11. A light source control device for a vehicle, comprising:
- a plurality of light sources connected in series;
- a supply section that supplies electricity to the plurality of light sources;
- a change section that changes a supply path along which electricity is supplied from the supply section to the plurality of light sources;
- a fault detection section that detects a fault in the supply path; and
- a control section that, when a fault is detected by the fault detection section in a state in which the plurality of the light sources are illuminated concurrently, attempts to recover at least one light source by controlling the change section to select a plurality of current supply paths in a sequence that prioritizes recovery of the at least one light source; wherein:

the plurality of light sources includes
- a first light source that is illuminated by electricity supplied from the supply section, and
- a second light source that is connected in series with the first light source and is illuminated by electricity supplied from the supply section;

the change section includes a first switch of which one end is connected to between the first light source and the second light source and another end is connected to ground;

the plurality of light sources further includes a third light source that is connected in series with the first light source and is illuminated by electricity supplied from the supply section; and the change section further includes
- a second switch provided between the supply section and an electricity supply path upstream side of the third light source,
- a third switch provided between the supply section and an electricity supply path upstream side of the first light source, and
- a fourth switch of which one end is connected to between the first light source and the third light source and another end is connected to ground;

in response to a pre-specified illumination command, the control section performs control to turn each of the first switch, second switch, third switch and fourth switch on or off and controls the electricity supply path from the supply section, and when a fault is detected by the fault detection section in the state in which the plurality of the light sources are illuminated concurrently, the control section implements recovery control of the light sources by performing control to turn each of the first switch, second switch, third switch and fourth switch on or off and implements recovery control of the light sources, prioritizing recovery of at least the first light source; and when a fault is detected by the fault detection section in a state in which the third switch is on and the other switches are off and the first light source and second light source are illuminated concurrently, the control section performs control to turn on the first switch and implements recovery control of the first light source.

12. A light source control device for a vehicle, comprising:
- a plurality of light sources connected in series;
- a supply section that supplies electricity to the plurality of light sources;
- a change section that changes a supply path along which electricity is supplied from the supply section to the plurality of light sources;
- a fault detection section that detects a fault in the supply path; and
- a control section that, when a fault is detected by the fault detection section in a state in which the plurality of the light sources are illuminated concurrently, attempts to recover at least one light source by controlling the change section to select a plurality of current supply paths in a sequence that prioritizes recovery of the at least one light source; wherein:

the plurality of light sources includes
- a first light source that is illuminated by electricity supplied from the supply section, and
- a second light source that is connected in series with the first light source and is illuminated by electricity supplied from the supply section;

the change section includes a first switch of which one end is connected to between the first light source and the second light source and another end is connected to ground;

the plurality of light sources further includes a third light source that is connected in series with the first light source and is illuminated by electricity supplied from the supply section; and the change section further includes
a second switch provided between the supply section and an electricity supply path upstream side of the third light source,
a third switch provided between the supply section and an electricity supply path upstream side of the first light source, and
a fourth switch of which one end is connected to between the first light source and the third light source and another end is connected to ground;
in response to a pre-specified illumination command, the control section performs control to turn each of the first switch, second switch, third switch and fourth switch on or off and controls the electricity supply path from the supply section, and
when a fault is detected by the fault detection section in the state in which the plurality of the light sources are illuminated concurrently, the control section implements recovery control of the light sources by performing control to turn each of the first switch, second switch, third switch and fourth switch on or off and implements recovery control of the light sources, prioritizing recovery of at least the first light source; and
when a fault is detected by the fault detection section in a state in which the second switch is on and the other switches are off and the first light source, second light source and third light source are illuminated concurrently, the control section performs control to turn on the first switch and implements recovery control of the first light source and third light source.

13. The light source control device for a vehicle according to claim 12, wherein, when a fault is detected by the fault detection section after the recovery control of the first light source and third light source, the control section performs control to turn off the first switch and second switch and turn on the third switch and implements recovery control of the first light source and second light source.

14. The light source control device for a vehicle according to claim 13, wherein, when a fault is detected by the fault detection section after the recovery control of the first light source and second light source, the control section performs control to turn off the third switch and turn on the second switch and fourth switch and implements recovery control of the third light source.

15. A light source control device for a vehicle, comprising:
a plurality of light sources connected in series;
a supply section that supplies electricity to the plurality of light sources;
a change section that changes a supply path along which electricity is supplied from the supply section to the plurality of light sources;
a fault detection section that detects a fault in the supply path; and
a control section that, when a fault is detected by the fault detection section in a state in which the plurality of the light sources are illuminated concurrently, attempts to recover at least one light source by controlling the change section to select a plurality of current supply paths in a sequence that prioritizes recovery of the at least one light source; wherein:
the plurality of light sources includes
a first light source that is illuminated by electricity supplied from the supply section, and
a second light source that is connected in series with the first light source and is illuminated by electricity supplied from the supply section;

the change section includes a first switch of which one end is connected to between the first light source and the second light source and another end is connected to ground;
the plurality of light sources further includes a third light source that is connected in series with the first light source and is illuminated by electricity supplied from the supply section; and
the change section further includes
a second switch provided between the supply section and an electricity supply path upstream side of the third light source,
a third switch provided between the supply section and an electricity supply path upstream side of the first light source, and
a fourth switch of which one end is connected to between the first light source and the third light source and another end is connected to ground;
in response to a pre-specified illumination command, the control section performs control to turn each of the first switch, second switch, third switch and fourth switch on or off and controls the electricity supply path from the supply section, and
when a fault is detected by the fault detection section in the state in which the plurality of the light sources are illuminated concurrently, the control section implements recovery control of the light sources by performing control to turn each of the first switch, second switch, third switch and fourth switch on or off and implements recovery control of the light sources, prioritizing recovery of at least the first light source; and
when a fault is detected by the fault detection section in a state in which the second switch is on and the other switches are off and the first light source, second light source and third light source are illuminated concurrently, the control section performs control to turn on the third switch and turn off the second switch and implements recovery control of the first light source and second light source.

16. The light source control device for a vehicle according to claim 15, wherein, when a fault is detected by the fault detection section after the recovery control of the first light source and second light source, the control section performs control to turn on the first switch and second switch and turn off the third switch and implements recovery control of the first light source and third light source.

17. The light source control device for a vehicle according to claim 16, wherein, when a fault is detected by the fault detection section after the recovery control of the first light source and third light source, the control section performs control to turn off the first switch and turn on the fourth switch and implements recovery control of the third light source.

18. A light source control device for a vehicle, comprising:
a plurality of light sources connected in series;
LED driving circuitry that supplies electricity to the plurality of light sources; and
at least one switch that changes a supply path along which electricity is supplied from the LED driving circuitry to the plurality of light sources;
fault detection circuitry to detect a fault in the supply path; and
control circuitry that, when a fault is detected by the fault detection circuitry in a state in which the plurality of the light sources are illuminated concurrently, performs a plurality of recovery attempts of at least one prioritized light source by sequentially supplying current along a plurality of different current supply paths while testing for light failure of the at least one prioritized light source.

* * * * *